US007383276B2

(12) United States Patent
Lomet

(10) Patent No.: US 7,383,276 B2
(45) Date of Patent: Jun. 3, 2008

(54) CONCURRENCY CONTROL FOR B-TREES WITH NODE DELETION

(75) Inventor: David B. Lomet, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 689 days.

(21) Appl. No.: 10/768,527

(22) Filed: Jan. 30, 2004

(65) Prior Publication Data

US 2005/0171960 A1 Aug. 4, 2005

(51) Int. Cl.
*G06F 7/00* (2006.01)
(52) U.S. Cl. .................................. 707/102; 707/101
(58) Field of Classification Search .................... 707/3, 707/104.1, 100, 10, 102, 101
See application file for complete search history.

(56) References Cited

U.S. PATENT DOCUMENTS 5,446,887 A * 8/1995 Berkowitz .................. 707/101
6,792,432 B1 * 9/2004 Kodavalla et al. ......... 707/103 R

OTHER PUBLICATIONS

Bayer, R. et al., "Concurrency of Operations on B-Trees", *Acta Informatica*, 1977, 9(1), 1-21.
Comer, D., "The Ubiquitous B-Tree", *Computing Surveys*, Jun. 1979, 11(2), 121-137.
Kornacker, M. et al., "Concurrency and Recovery in Generalized Search Trees", *ACM Sigmod*, 1997, 62-72.
Lehman, P.L. et al., "Efficient Locking for Concurrent Operations on B-Trees", *ACM Transactions on Database Systems*, Dec. 1981, 6(4), 650-670.
Lomet, D., Simple, Robust and Highly Concurrent B-Trees with Node Deletion, 8 pages.
Lomet, D., et al., "Access Method Concurrency with Recovery", *ACM Sigmod Conf.*, 1992, 351-360.
Lomet, D. et al., "Concurrency and Recovery for Index Trees", *VLDB J.*, 1997, 6(3), 224-240.
Sagiv, Y. et al., "Concurrent Operations on B Trees with Overtaking", *J Computer and System Sciences*, 1986, 33(2), 275-296.
Srinivasan, V. et al., "Performance of B-Tree Concurrency Control Algorithms", *ACM Sigmod Conf.*, 1991, 416-425.

* cited by examiner

*Primary Examiner*—Hosain T Alam
*Assistant Examiner*—Leon J Harper
(74) *Attorney, Agent, or Firm*—Woodcock Washburn LLP

(57) ABSTRACT

A data structure, added to a modified form of the $B^{link}$-tree data structure, tracks delete states for nodes. The index delete state ($D_X$) indicates whether it is safe to directly access an index node without re-traversing the B-tree. The $D_X$ state is maintained globally, outside of the tree structure. The data delete state ($D_D$) indicates whether it is safe to post an index term for a new leaf node. A $D_D$ state is maintained in each level 1 node for its leaf nodes. Delete states indicate whether a specific node has not been deleted, or whether it may have been deleted. Delete states are used to remove the necessity for atomic node splits and chains of latches for deletes, while not requiring retraversal. This property of not requiring a retraversal is exploited to simplify the tree modification operations.

21 Claims, 7 Drawing Sheets

CONCURRENCY CONTROL FOR B-TREES WITH NODE DELETION

FIELD OF THE INVENTION

This invention relates to methods and systems for data storage. More particularly, this invention relates to methods and systems for utilizing B-trees for storing data, maintaining a robust and simple data structure and allowing high concurrency of access.

BACKGROUND OF THE INVENTION

A B-tree is a tree structure which stores data, and allows operations to find, delete, insert, and browse the data. Each data record stored in a B-tree has an associated key. In order to be used for a B-tree, these keys must be orderable according to a predetermined function. For example, the keys may be numeric, in which case the ordering may be from least to greatest. As another example, the keys may be names, in which case the ordering may be alphabetical.

A B-tree is height-balanced, so all leaves are at the same level of the tree. Insertions and deletions of records to the B-tree are managed so that the height-balanced property of the B-tree is maintained. The insertion of a new data record may require the split of a node into two nodes; a deletion may require the deletion of a node. Insertion and deletion procedures must maintain the properties of the B-tree (e.g. height balance) in order to ensure that they result in valid B-trees.

Each B-tree leaf contains one or more of the stored records in one of a disjoint set of ranges of key values, while each index node (non-leaf node) of a B-tree provides access to a range of key values stored in one or more adjacent key ranges contained in data nodes. Each index node of the B-tree stores, for each of its child nodes, an ordered pair consisting of a key value within the range and a pointer to the child node. The key values break the range of key values represented by the node into sub-ranges, and the pointers to a leaf within the sub-range (if the index node is one level above the leaf level) or point to an index node corresponding to that sub-range.

FIG. 1 is a block diagram of an exemplary subtree in a B-tree data structure. As shown in FIG. 1, a sub-tree of a B-tree contains leaves 1010 storing records with the keys shown in those leaves 1010. Leaf nodes are also known as data nodes. Index node 1000 corresponds to the range between 21 and 133. Index node 1000 contains three ordered pairs (index pairs). The first ordered pair contains the key value 21 and first pointer 1020 of index node 1000, which points to index node 1025. A second ordered pair contains the key value 49 and second pointer 1030. This indicates that the pointer in the first ordered pair should be followed to reach any record with a key greater than or equal to 21 (the key value in the first pair) and less than 49 (the key value in the second pair). The key value in the second ordered pair, along with the key value of 93 in the third ordered pair, indicates that any record with a key greater than or equal to 49 and less than 93 will be found in the sub-tree whose root is index node 1035. The third ordered pair, containing third pointer 1040, indicates that any record with a key greater than or equal to 93 will be found in the sub-tree whose root is index node 1045.

It can be seen that an index node will have as many ordered pairs of <key, pointer> as it has child nodes. The range represented by each index node need not be explicitly stored in the index node. In the sub-tree of FIG. 1, node 1035 corresponds to the range of key values v where $49 \leq v < 93$, though this range is not be explicitly stored in node 1035 in the example. Any search for key values in the range $49 \leq v < 93$, though, will reach node 1035. In addition to being height-balanced, another B-tree constraint concerns the number of nodes which can exist below a given node which is determined by the order assigned to the B-tree. When an additional node is being added below a parent node which already has the maximum number of nodes, the result would violate this constraint. In practice, the order of a B-tree is determined dynamically, when a node of the tree fills up. In this case, a node split occurs, as described below.

To search a B-tree for a record, the search begins at the root node and follows pointers from node to node based on the key value for the record being sought, descending down the tree, until either the key is located or the search fails because a leaf node is reached which does not contain a record with the key being searched for. For example, if the record with key value 113 is being sought, when index node 1000 is reached, the key values are consulted. Since the key value being sought is greater than the key value in the rightmost pair in node 1000, the pointer 1040 from that pair is followed. Node 1045 is reached. When the key values are consulted, it can be seen that pointer 1048 should be followed to find any record with a key value $109 \leq v \leq 122$. This pointer 1048 leads to the appropriate leaf from leaves 1010 which contains the record for the specified key value. If a record was searched for with a key value of 112, the search would end in the same location, but because no record is found with that key value in the leaf node, the search would return an unsuccessful result.

When a node has the maximum number of key values (when there is not sufficient space for any additional index term or data record), if a new key value must be inserted into the range covered by the node, the node will be split. In order to ensure that concurrent accesses are not reading data from the node during the split, it is necessary to deny concurrent access to the node being changed. Because two nodes will now hold the information previously held by the node being split, an additional link is necessary in the parent node of the node being split. Concurrent accesses to that parent node must therefore be denied while the parent is updated. If the addition of a new key value and pointer in the parent node will overfill the parent node, the parent node will be split as well. It can be seen that node insertions may cause splits recursively up the B-tree. This may require that a node high in the tree be locked while nodes much further down in the tree are being split, and while the split slowly propagates its way up to the locked node. This greatly impairs concurrent access to the tree. The necessity for a number of locks or latches to prevent concurrent accesses to nodes being changed slows access to the information stored in the B-tree by limiting concurrent access.

A $B^{link}$-tree is a modification of the B-tree which addresses this issue. FIG. 2 is a block diagram of an exemplary subtree in a $B_{link}$-tree data structure. Each non-leaf node contains an additional ordered pair, a side pair, including a side key value and a pointer (termed the "side pointer") which points to the next node at the same level of the tree as the current node. The side pointer of the rightmost node on a level is a null pointer. Thus, as shown in FIG. 2, the subtree of a B-tree shown in FIG. 1 may be converted into a subtree of a $B^{link}$-tree with the addition of side pairs 1107, 1127, 1137, and 1147. Side pointer from side pair 1147, because it is the side pointer of a rightmost node on a level, is null. Side pointer from side pair 1107 is also shown as null, this could indicate that node 1000 is the root node or that it is the rightmost node on a level. The side key value indicates the lowest value found in the next node at the same level of the tree. Therefore, the range of values in a node may be seen by examining the index term for the node in its parent node (which is the lower bound and is included in the range) and the side key value (which is the upper bound but is not included in the range). The purpose of the side pointer is to provide an additional method for reaching a node. Each leaf node also contains a side pointer which points at the next leaf node, such as side pointer 1117.

One benefit of using these side pointers is to enable highly concurrent operation by allowing splits to occur with each atomic action of the split involving only one level of the tree. With B-link trees, in order for a split to occur on a full node the contents of the full node are divided (one atomic action), and a new index term is posted to the parent (second atomic action). This avoids the situation in which multiple levels of the tree are involved in a single atomic action. If a split is occurring in a node at the same time that a search is being performed for a key value in the range for that node, and the node has been split, with the lefthand node replacing the node which has been split, the tree can be traversed to find data even if no index term has yet been inserted into the parent of the node for the righthand node from the new pair. In such a case, the parent node will point to the lefthand node, and if the data is not found in the lefthand node, the side pointer of the lefthand node provides access to the righthand node. Thus a node split need not be a single atomic operation with the parent and child nodes both inaccessible until the split is completed.

In B-trees and $B^{link}$-trees, latches are used in order to provide mutual exclusion when a node split or node deletion is occurring. A latch is a low-cost, usually short-duration lock, one which does not include deadlock control. Hence, it is not necessary to access a lock manager in order to acquire or release a latch. Latches are therefore more lightweight than locks; they typically require only tens of instructions, not hundreds like locks. They prevent access of incorrect or outdated data during concurrent access of the data structure by allowing only an updater holding the latch to use the resource that has been latched.

Because no deadlock control exists for latches, a partial ordering is imposed on latches. The holder of a latch on a parent node may request the latch for a child node of that parent node. Latches can propagate downward. However, the holder of a latch on a child node can not request the latch for the parent without first releasing its latch on the child; latches do not propagate upwards. In this way, the deadlock situation in which the holder of a latch for parent node A is requesting a latch for child node B at the same time that the holder of a latch for child node B requests a latch for parent node A is avoided. In a standard B-tree, the latch must be maintained for the node being updated, and for the parent of that node (and possibly for multiple ancestors up the tree, even perhaps to the root), so the pointers and key values in the parent can be modified to reflect the change. If the latch is not maintained for the parent, the tree can become inconsistent. The latches must typically be maintained for all the nodes on the path to a leaf node that may need to be updated because of a node split at the leaf.

In a $B^{link}$-tree, however, a latch is not required on the parent node (and any further ancestors) while the child node is being split. As described above, where the child node has been latched for the node split, the parent latch need not be held during the child node split, while the new nodes have been created but the parent node for these new nodes has not yet been updated. A node split therefore need not be an atomic operation that includes posting the index term to the parent, but can be divided into two parts ("half splits"), the first "half split" where a child node is split, moving some data from an old node to a new node, and setting up a side link from the old node to the new node. After such a "half split" the $B^{link}$-tree will be well formed. A subsequent second "half split" posts an index term to the parent node.

However, there is a risk that several changes (node deletes, described below, and splits) will occur, and that when the parent node is changed to reflect the new child node, that that child node will no longer exist. To guard against this requires that the existence of the child node be re-verified, which requires re-visiting the left-hand (originally full) node and ensuring that the side pointer for that node still references the right-hand (new) node. Additionally, when a node split occurs, the path to the node being split is remembered. There is a risk that when the key value and pointer for the split is to be added to the remembered parent node, that parent node no longer exists because it may have been deleted. Guarding against this requires a tree re-traversal which is resource intensive. Thus, the prior art methods of B-link node splitting incur extra execution costs, which in turn limit concurrency and throughput, and increase the complexity of the implementation.

SUMMARY OF THE INVENTION

A $B^{link}$-tree data structure, method and system is presented which includes the advantages of B-tree data structures and conventional $B^{link}$-tree data structures, yet allows highly concurrent access of the data and deals robustly with node deletion.

In order to do this, the "delete state" is tracked for a $B^{link}$-tree data structure. This delete state is guaranteed to capture when a node among some set of nodes has been deleted. Thus, the absence of state indicating that any node among the set of nodes has been deleted ensures that some specific node in that set has not been deleted. Two delete states are tracked to deal separately with the two complications resulting from node deletes: (i) a parent to which an index term is scheduled to be posted may have been deleted; (ii) a new node for which an index term is scheduled to be posted may have been deleted. By tracking delete states, $B^{link}$-tree node split operations avoid tree re-traversals to find the parent node to be updated; and they avoid having to verify that a newly created node whose index term is scheduled to be posted still exists. Additionally, split operations are divided into two atomic operations, and the second atomic operation does not need to be completed for the tree to be used. The two atomic operations allow for high concurrency, and the tolerance for "lazy" scheduling of the second atomic operation (index term posting) is a simple solution which allows for easy implementation and coherence.

For a target node to be split, first, the side pointer and a portion of the stored data is moved to a new index node and the side pointer of the target node is set to point to the new index node. Then, a post operation is queued. When this operation is performed, the information regarding the new index node is posted to the parent node. Should a node delete be detected that might cause the need to re-traverse the tree to find a parent, or to re-verify that a new node still exists, the index term posting half of the node split operation is terminated, thus avoiding making this more complex and expensive. Such incomplete posting of index terms are completed when it is detected that the index term is missing in a subsequent traversal of the tree.

Other features of the invention are described below.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Overview

Figure 1:
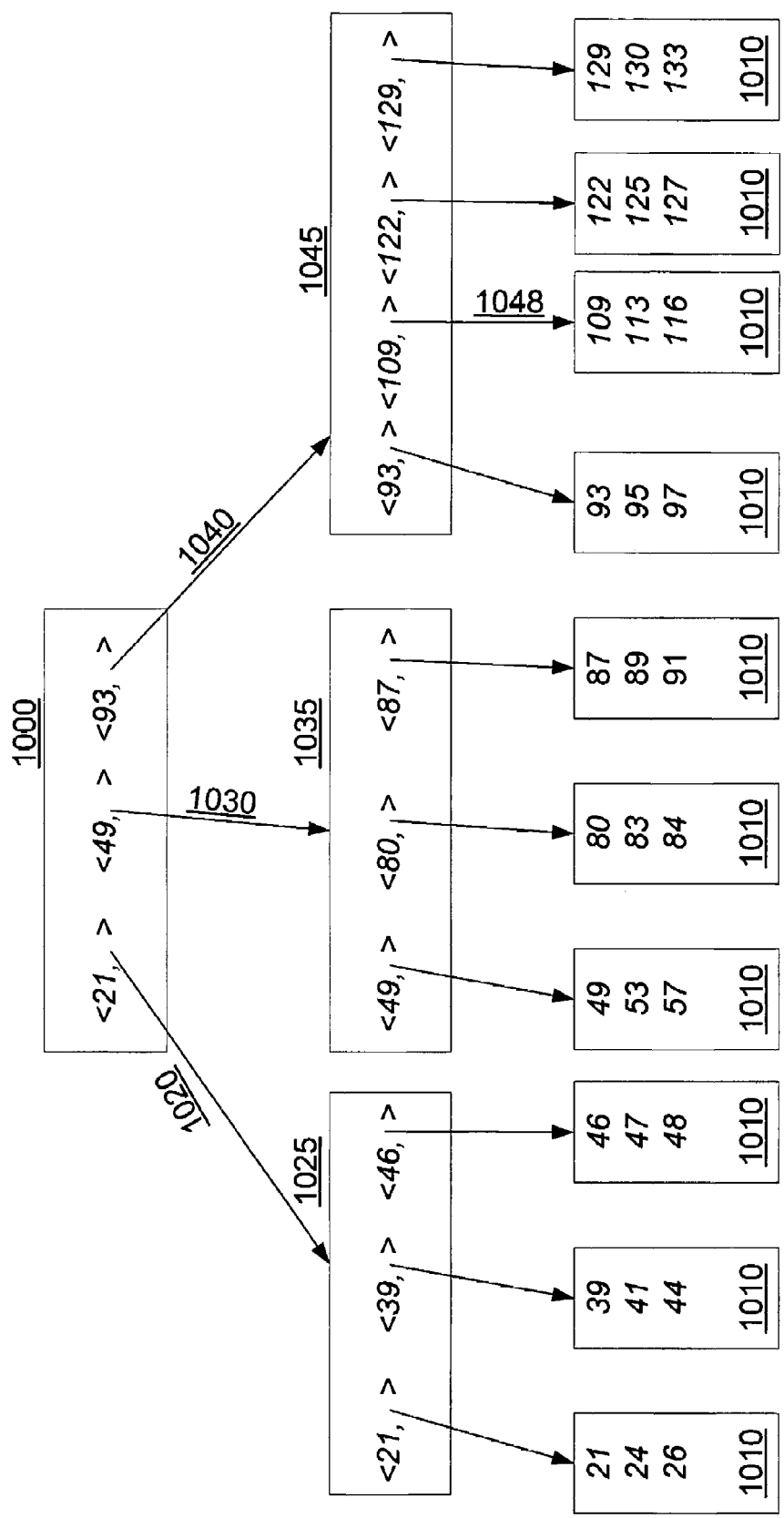
FIG. 1 is a block diagram of an exemplary subtree in a B-tree data structure.
Figure 2:
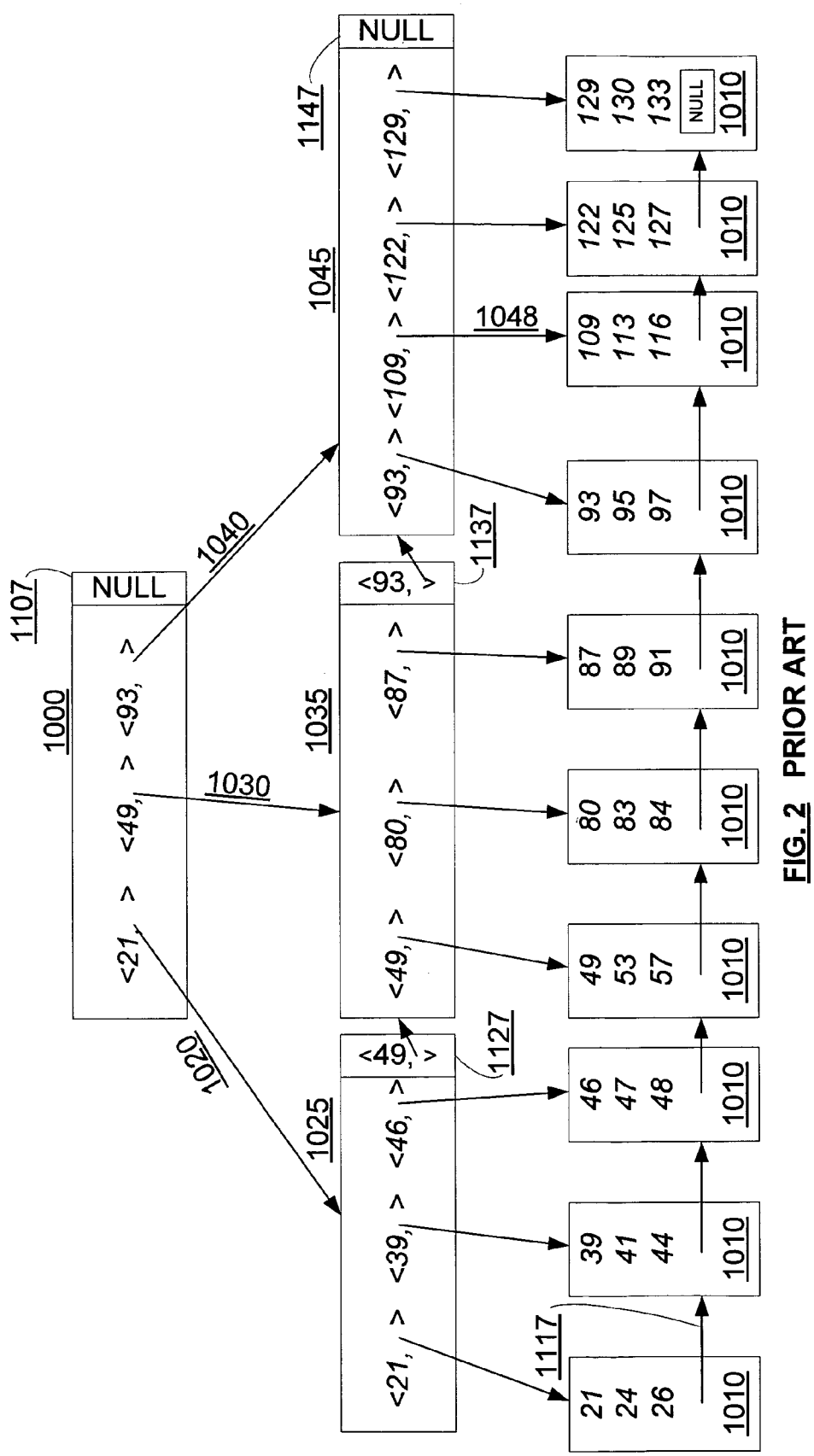
FIG. 2 is a block diagram of an exemplary subtree in a $B^{link}$-tree data structure.

The first tracked delete state, the index delete state ($D_X$) indicates whether it is safe to directly access a parent node (hence an index node, not a data node) without re-traversing the B-tree. $D_X$ contains this information for all nodes above the leaf level; and in one embodiment it is maintained outside of the tree since any index node may be deleted. $D_X$ (nodeA) can be consulted to determine that index nodeA may have been deleted, or that index nodeA cannot have been deleted. In one embodiment, $D_X$(n) is a binary function over all index nodes n in the B-tree, with one possible value indicating that the node cannot have been deleted, and the other possible value indicating that the node may have been deleted. In another embodiment, $D_X$ is a counter which is incremented when an index node has been deleted, so that a change in $D_X$ indicates that a node delete has occurred, while no change means that no nodes have been deleted since the earlier inspection of $D_X$.

The second tracked delete state, data delete state ($D_D$) indicates whether it is safe to post an index term for a leaf node that resulted from a data node split. Since we access the parent of the leaf node resulting from a split in any event to post the index term, the $D_D$ state can be stored in the parent, and where each node is assigned to a disk page, without incurring any extra I/O to access the page. Leaf node deletes are much more common than index node deletes, and so there is real value to localizing leaf node deletes to a sub-tree without requiring additional latching. A $D_D$ state is maintained in each level 1 node (nodes which are parents of a leaf). In one embodiment, $D_D$ is a binary function over all leaf nodes and $D_D$ (nodeB) returns one value if leaf nodeB may have been deleted, and another if leaf nodeB cannot have been deleted. For index nodes which are higher up in the tree, $D_X$ is used for this verification.

In one embodiment, for both delete state tests, the value indicating that the node may have been deleted may be returned even when the node being asked about has not been deleted. In one embodiment, if this value is returned, further activity on the node is abandoned or postponed. No index term will be posted. The absence of a posted index term will be re-discovered when a $B^{link}$-tree traversal is required to include a side link traversal. The abandonment of the posting of the index term when delete states indicate that a node may have been deleted allows concurrency to be accomplished in a simple manner. The tree will always allow searches to be executed correctly, and where an index node posting is abandoned due to the delete state, subsequent actions will allow the missing index node posting to be discovered and requeued. This allows the node split to be simple and avoids retraversals, and yet allows for a way for such node postings to be detected and performed later.

In another embodiment, the tree is re-traversed when the node may have been deleted. This may cause a delay while the presence of the node is found (or while the correct node which is the parent of the node being split or deleted is found). However, deletions and splits of nodes will still occur correctly, and will enable index terms to be propagated up the tree correctly despite this delay.

Because a $B^{link}$-tree is used, the tree remains search correct even when index terms are missing. Since the delete state need only be checked during structure modifications, normal $B^{link}$-tree operations can be almost completely unaffected.

In one embodiment, delete states are maintained as binary functions for each node. In another embodiment, delete states are maintained as counters for a group of nodes, which are updated when a node is deleted.

Exemplary Computing Environment

Figure 3:
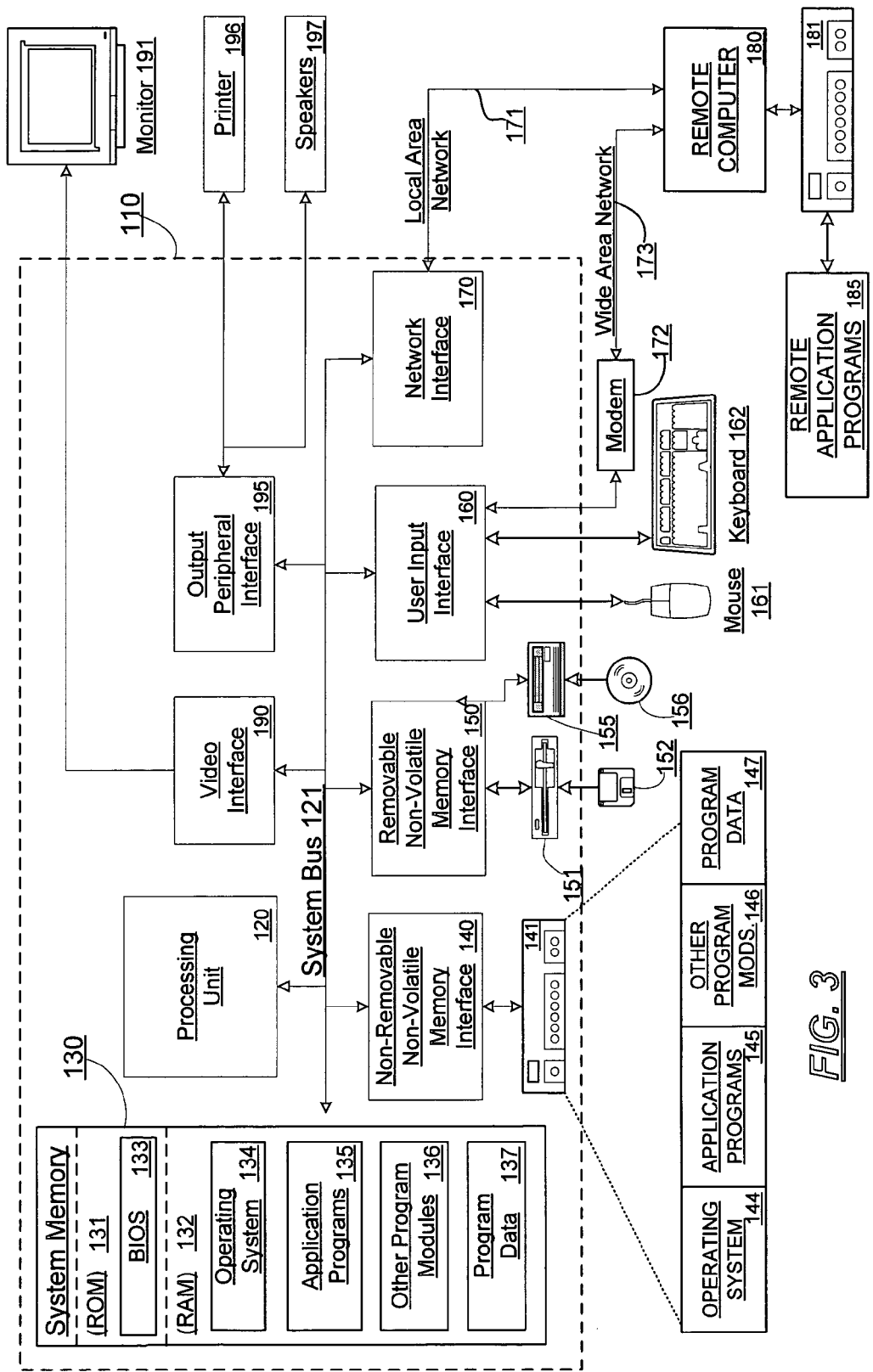
FIG. 3 is a block diagram of an exemplary computing environment in which aspects of the invention may be implemented.

FIG. 3 shows an exemplary computing environment in which aspects of the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, embedded systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 3, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The processing unit 120 may represent multiple logical processing units such as those supported on a multi-threaded processor. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus). The system bus 121 may also be implemented as a point-to-point connection, switching fabric, or the like, among the communicating devices.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 3 illustrates operating system 134, application programs 135, other program modules 136, and program data 137.

The computer 110 may also include other removable/non-removable, volatile/nonvolatile computer storage media. By way of example only, FIG. 3 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 3, provide storage of computer readable instructions, data structures, program modules and other data for the computer 110. In FIG. 3, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 3. The logical connections depicted in FIG. 3 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 3 illustrates remote application programs 185 as residing on memory device 181. It will be appreciated that the network connections shown are exemplary and other means of establishing a communications link between the computers may be used.

$B^{link}$-tree with Delete States

Figure 4:
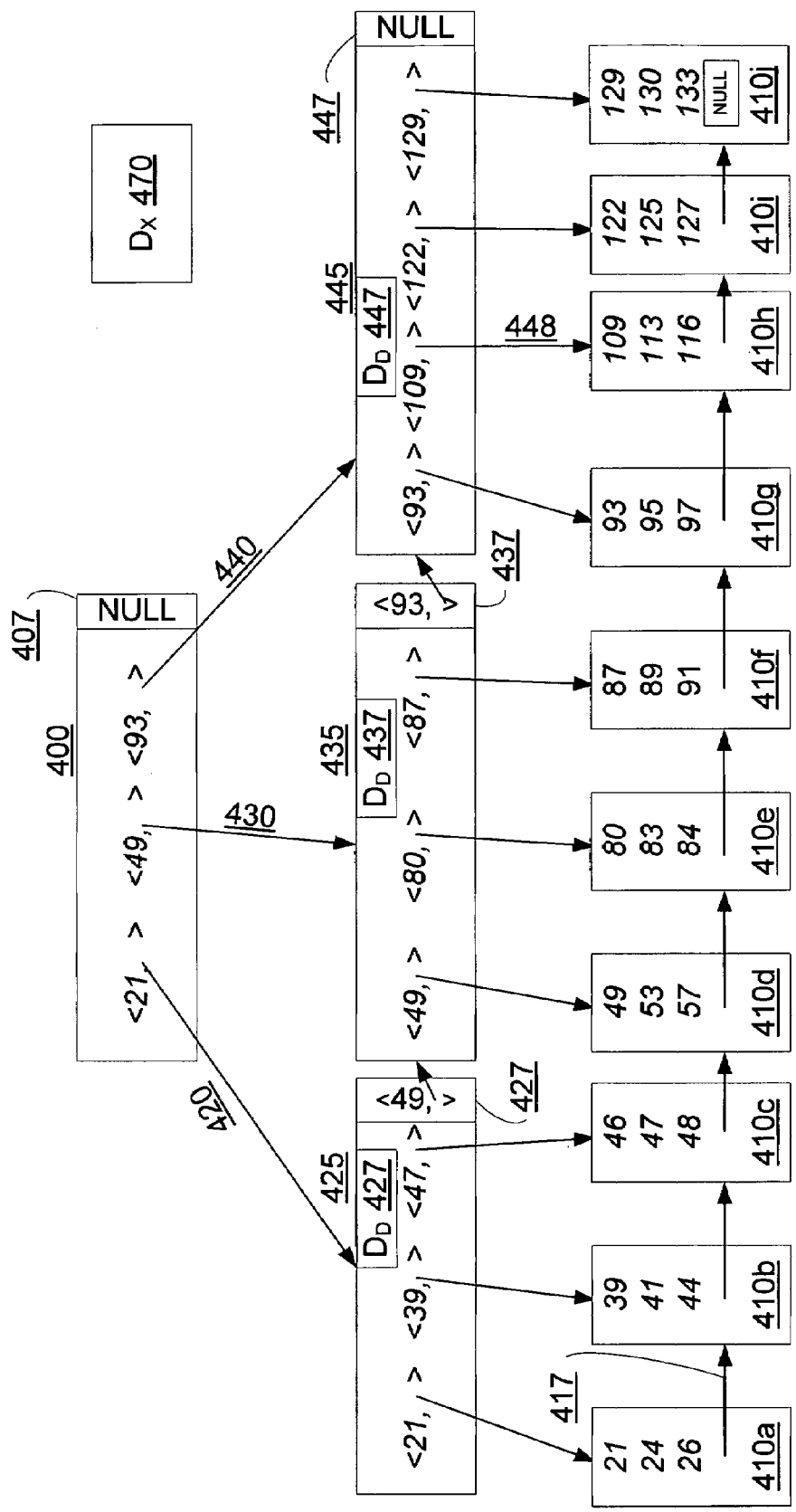
FIG. 4 is a block diagram of an exemplary modified $B^{link}$-tree data structure according to one embodiment of the invention.

A $B^{link}$-tree according to one embodiment of the invention is shown in FIG. 4. The root node of the $B^{link}$-tree 400 contains three ordered pairs including pointers 420, 430, and 440 to index nodes 425, 435, and 445. These index nodes point to leaf nodes 410a through 410j, also known as data nodes. Each data nodes contains data values and a side pointer which points to the next data node in sequence. The root node also contains a side pair 407, and index nodes 425, 435, and 445 contain side pairs 427, 437, and 447, respectively. Additionally, an index delete state $D_X$ 470 is stored, which, for each index node, indicates whether the index node has not been deleted, or whether it may have been deleted. In index nodes 425, 435, and 445, a data delete state $D_D$ (427, 437, and 447, respectively) is stored. This data delete state stores the delete state for each of the child leaf nodes of an index node which is just above the leaf node level. For example, for index node 445, data delete state $D_D$ 447 tracks the delete state of the leaf nodes 410g, 410h, 410i and 410j. As will be described later, events may occur that may indicate that one of these nodes has been deleted. In such situations, the state for that leaf node in data delete state $D_D$ 447 will be changed to indicate that it may have been deleted.

Figure 5:
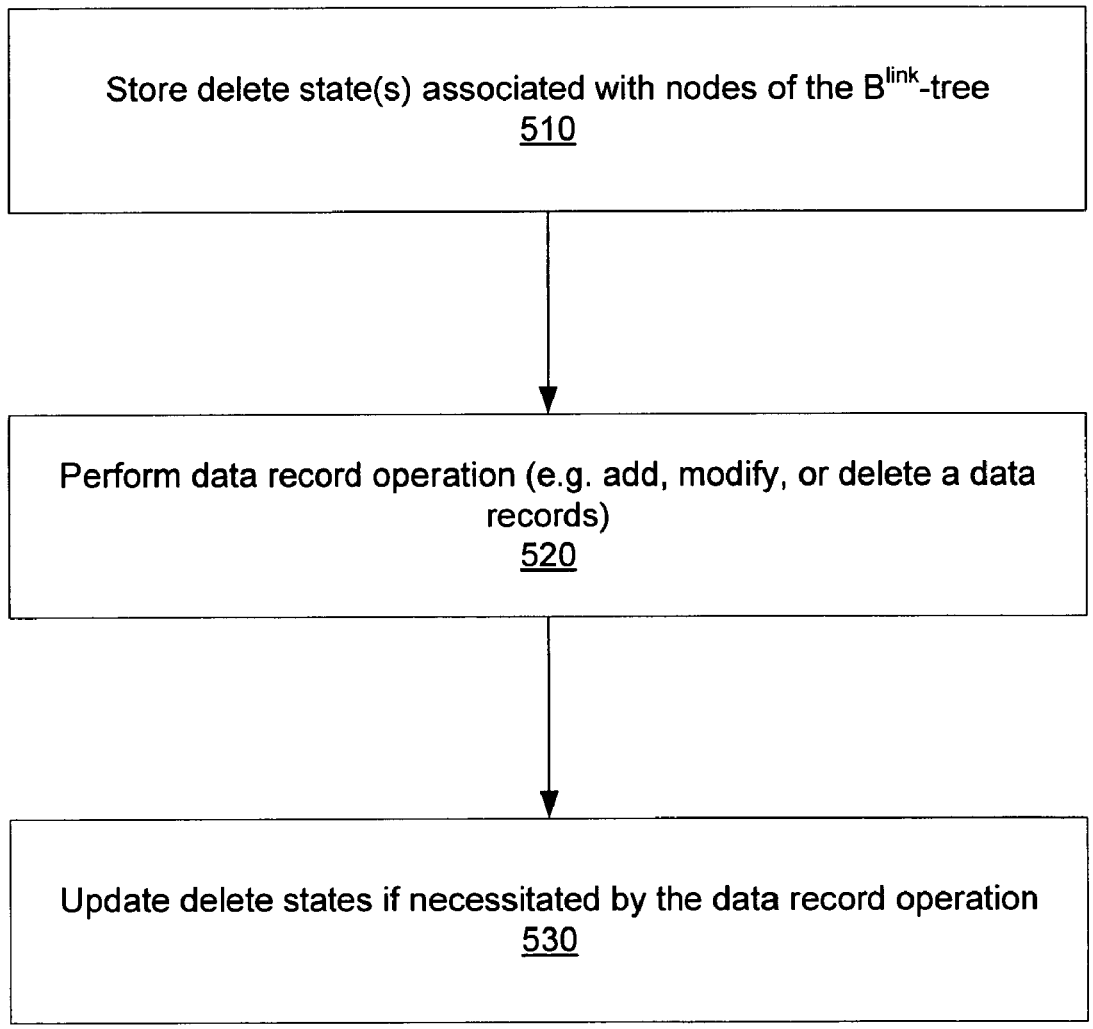
FIG. 5 is a flow diagram of the use of the modified $B^{link}$-tree according to one embodiment of the invention.

As shown in FIG. 5, at least one delete state associated with one or more of the nodes of the $B^{link}$-tree is stored, step 510. A data record operation (adding, modifying, and deleting data records) is performed, step 520. Additionally, delete states are updated if necessitated by the data record operation, step 530.

According to one embodiment of the invention, the normal data record operations of reading a record, range reading records, inserting a record, updating a record, and deleting a record are supported. To implement one embodiment of the invention, latches come in multiple modes: share, update, and exclusive. These latch modes support different levels of concurrent access.

An exclusive latch on a resource prohibits other latches from being obtained for the resource, and can only be obtained if no other latch is held on the resource. No other latches are allowed if an exclusive latch is held. A share latch is compatible with other share latches, and with another type of latch known as an update latch. Share latches allow reading of the resource but not modification of it. Only one update latch may be held on a resource at one time though share latches may be held on it concurrently; update latches are used to allow a user to upgrade the latch to an exclusive latch without relinquishing the update latch. Users with a share latch may not upgrade to an exclusive latch without first releasing control of the resource.

Because adding records and deleting records may require changes in the structure of the tree (deletion or addition of index nodes), node deletion and node split operations may be necessitated by the addition or deletion of records and the structural requirements of the $B^{link}$-tree.

Tree Functionality

To use the tree, according to one embodiment of the invention, several functions/operations are supported. These include:

Tree Traversal—traversal of a tree to find a desired node. This node may be a leaf node or an internal node. This is used to find a node for a user (for example for a record lookup) and also to provide traversal for other operations;

Node Update—inserting, modifying, or deleting information in a node;

Node Split—splitting a node into two separate nodes, in order to accommodate more information at that point in the tree than can fit into one node. According to one embodiment of the invention, this is performed in two distinct "half-split" operations, with the second half-split capable of being queued to be performed later (or abandoned, if the tree has changed too much to make it a simple change.);

Access Parent—used to access a parent node and to check if a deletion may have occurred, in order to allow simplicity in splitting nodes and realize the efficiency gain from keeping the delete states;

Post Index Term—used to post an index term to a node, in order to perform the second part of a node split operation; and Delete Node—used to delete a node, in order to consolidate index nodes with low occupancy.

A more complete description of these operations, according to one embodiment, is supplied below.

Tree Traversal

In order to perform operations on the tree, the tree must be traversed to find the desired node. The node may be a leaf node or an intermediate node. Because nodes may be split or deleted, and a parent node may not contain index terms for all its child nodes, traversals may occur which utilize side pointers rather than pointers which appear as part of an index pair.

With reference again to FIG. 4, as an example of tree traversal, if, for example, the tree is a sub-tree which has been reached during a tree traversal to find a record with a key value of 80, a share latch is obtained for node 400. Node 400 is then consulted, and pointer 430 followed. When node 435 is reached, it will in turn be latched in share mode. At that point, the latch on node 400 is released. A read node operation will be run on node 435 to find the entry that points to the leaf node that is the home for a record with key value of 80. In this case, this is 410e. Node 410e is latched in share mode, and then the latch on node 435 is released. Node 410e is then searched for the record with key value of 80. This sequence of latching a node before unlatching its parent in the path is called latch coupling. During tree traversal, it may be the case that a side pointer is followed rather than a index pointer. If this is the case, the node pointed to by the side pointer is not referenced by an index term in the node which should be its parent node. An index term posting is therefore scheduled. Additionally, underutilized nodes may be discovered during tree traversal, and such underutilized nodes should be deleted. Range reading is also possible, to traverse the tree and return any records with key values in the specified range.

The tree traversal operation, in one embodiment, proceeds according to the following pseudocode, where tree traversal begins with nodeA, (which has been latched), the key value being searched for is K and the requested level of the node to be found is R:

Traverse (nodeA, K, L)
1. Search nodeA for the correct entry entryA for K;
2. Latch the node (nodeB) referenced by the correct entry for K
3. Release the latch on nodeA
4. If entryA was a side pointer rather than an index pointer, enqueue a post index term action to post the pair <entryA, nodeB> to nodeA
5. If nodeA is underutilized, enqueue a node deletion action for nodeA
6. If nodeB is a higher level than has been requested, or if nodeB is a sibling node of nodeA, then recursively perform a tree traversal on nodeB for key K at requested level L; otherwise, return nodeB.

In one embodiment, the tree traversal also receives data as to the requested type of latch to be used.

Reading Records

In order to read a record with a given key, the tree is traversed to find the leaf node which will contain the desired key if it exists. When tree traversal is being done to perform a read operation, a share latch is obtained for the each node in the path to the leaf node as the tree is being traversed. Once the appropriate leaf node is returned, a read operation is performed.

Thus a read node operation can, in one embodiment, be represented by the following pseudocode, where "Traverse" is the tree traversal operation detailed above and "root" is the root node of the tree:

Read Node (Key value)
1. Perform Traverse (root, Key Value, leaf)
2. Set Leaf Node equal to the node returned from the Traverse
3. Read (Leaf Node, Key Value)

Update (for Insertion, Modification, or Deletion of a Node)

An update to a node is similar to the reading of a node, except that the latch obtained before the update must be exclusive, rather than shared. Thus, an update of a node consists of a tree traverse to the node followed by an insert, modify or delete of the node via an update operation. During the traversal, nodes are latched in share mode until a leaf node for the record to be inserted, updated, or deleted is reached. The leaf node is then latched with an update latch, and an exclusive latch is obtained when we confirm that the node accessed is the desired node (which, to find it, may require further side traversal). The leaf node is returned from the tree traversal latched exclusively and an update operation may then be performed on the leaf node.

If the operation necessitates the insertion of an entry into a node which is at maximum capacity, a split node action for the maximum capacity node is undertaken, and then the insert is retried. As in the case of a read record, if at the completion of the update node operation the node is found to be under-utilized, a delete node operation is enqueued for that node.

The pseudocode for an insert, modify, or delete in one embodiment is as follows, where Action represents the action to be performed on the target node and Action Information represents information needed for the action (for example, the record to be inserted where the Action is an insertion). Update is a function which inserts, modifies or deletes the node according to the specified action. This may, in the case of an insert or of certain updates, cause a node to be too full. If this is the case, the update will fail if the node is full, a split node will be attempted, and the action retried:

Update Node (Key Value, Level, Action, Action Information)
1. Perform Traverse (root, Key Value, Level)
2. Set TargetNode equal to the node returned from the Traverse
3. Update (TargetNode, Action, Action Information)
4. If Update fails due to TargetNode being full, then perform a Split Node (TargetNode) and then retry the Update Record action
5. If TargetNode is underutilized, enqueue (Delete Node (TargetNode))

Split Node Operations

In order to perform a split node operation, two distinct half split operations are performed. The first half split operation involves moving the high range contents of the target node being split to a new node. The side pair is also moved to the new node. The side pair in the target node is changed to point to the new node, and contains also the low key value for the new node. When this first half split operation is completed, all the data is accessible and can be found during a tree traversal. The first half split operation is not enqueued to be performed at some future time, because split node operations create room for adding data to a node. If this is not done promptly, the update operation which called for the split node will need to wait or be aborted. This first half split operation can be done immediately, however, because the exclusive latch will already be held by the calling operation on the node. A latch need not be held on the parent of the target node being split, only on the target node itself. No latch is needed on the new node as others cannot access the new node. The only path to the new node is via the original target node, on which we are already holding an exclusive latch.

The second half split operation involves the posting of an index term and index pointer for the new node in the parent node. This is done by enqueueing this index posting on the queue of work.

In order to perform an index posting, an Access Parent operation is performed. An Access Parent operation is used to access a parent node when a split or delete has occurred to one of its children. The Access Parent operation accesses the parent of a node so that the index term for a node can be inserted or deleted or so that a deletion can occur. It is given the remembered parent node address (RememberedParent) of the node (Node) and the type of action being performed, and returns with the latched parent node or an error if the parent may have been deleted. The Access Parent operation can be described, in one embodiment, with the following pseudocode:

1. Latch $D_X$ in share mode if the call is for post index term operation, in exclusive mode if the call is for a delete node operation.
2. If test of $D_X$ shows delete has occurred, release $D_X$ latch and return error.
3. If the parent access is for an index node deletion, update $D_X$.
4. Latch node requested (RememberedParent) and release $D_X$ latch.
5. Use Traverse to find the parent for the given Node. Use the results of this traversal to check if Remembered-Parent continues as the parent or whether the parent has split and real parent is a sibling of remembered node.
6. If the Access Parent is for a data node deletion, then update $D_D$ state.

7a. Else if Access Parent is to post index term for a data node: if $D_D$(node) has changed then release the node latch and return error.

7b. Else if Access Parent is to post an index term for an index node: if $D_X$ has changed, then release node latch and return error.

8. Return the parent found in the Traverse step.

When an access parent operation is run, it returns with the latch on the parent of the target node which has changed (by being split or deleted) if the parent node exists. The parent node being accessed in an access parent operation will be level 1 or higher. That is, it will not be a leaf node. Thus, there will be a delete state stored in $D_X$ for the node. Access parent first latches $D_X$ with a share latch, and then, if the state stored therein indicates that the parent must exist, the parent node is latched. Once the parent node is latched, it can not be deleted until it is unlatched.

Access parent returns with an error if the delete state of the parent node indicates that the parent node may not exist. In this way, access parent verifies without the necessity of tree traversal that the parent node definitely exists, and only if it does definitely exist is a traversal undertaken.

In one embodiment, access parent is also called with an indication of whether it is handling a delete or an index posting due to a split. If access parent is called for the index posting to a parent node of child node information, the delete state of the child node is also checked to ensure that the child node still exists. If it might not exist, access parent returns with an error.

For a second half split index posting, if access parent returns with an error, the index posting is not performed. All data in the tree still remains properly accessible through side pointers, and an error returned from access parent in this situation is generally sufficiently rare that the lack of an index posting for the new node is not an issue. In another embodiment, when an access parent returns with an error, the tree is traversed to find the correct parent for the index posting and the index posting is then made.

When the second half split has identified the parent node and has obtained the latch on the parent node, the update node operation is then used to post the index term. This may lead to a split of the parent node; however, such a parent node split will be a separate atomic action, decoupled from the split caused it.

Thus, the split node operation can be described, in one embodiment, with the following pseudocode, where a latch is held on the OriginalNode (the node to be split):

[First Half-Split]

1. Allocate new node.
2. Split data between OriginalNode and the new node.
3. Set the new node side pointer and key space description to the OriginalNode side pointer.
4. Set the OriginalNode side pointer to point to the new node, and its key space description to the low key bound of the new node.

[Second Half-Split]

5. Enqueue a Post Index Term operation for posting the index term for the new node to the parent of the OriginalNode In Step 1, where a new node is allocated, no latch is required as the node is invisible to the rest of the tree. The first half of the split operation is embodied in steps 1-4, and the second in the operation enqueued in step 5.

The Post Index Term operation can be described, in one embodiment, with the following pseudocode:

1. Access parent of split node via Access Parent. If an error is returned, abort posting.
2. If no error was returned, use Update to update the node with the index term.

Figure 6:
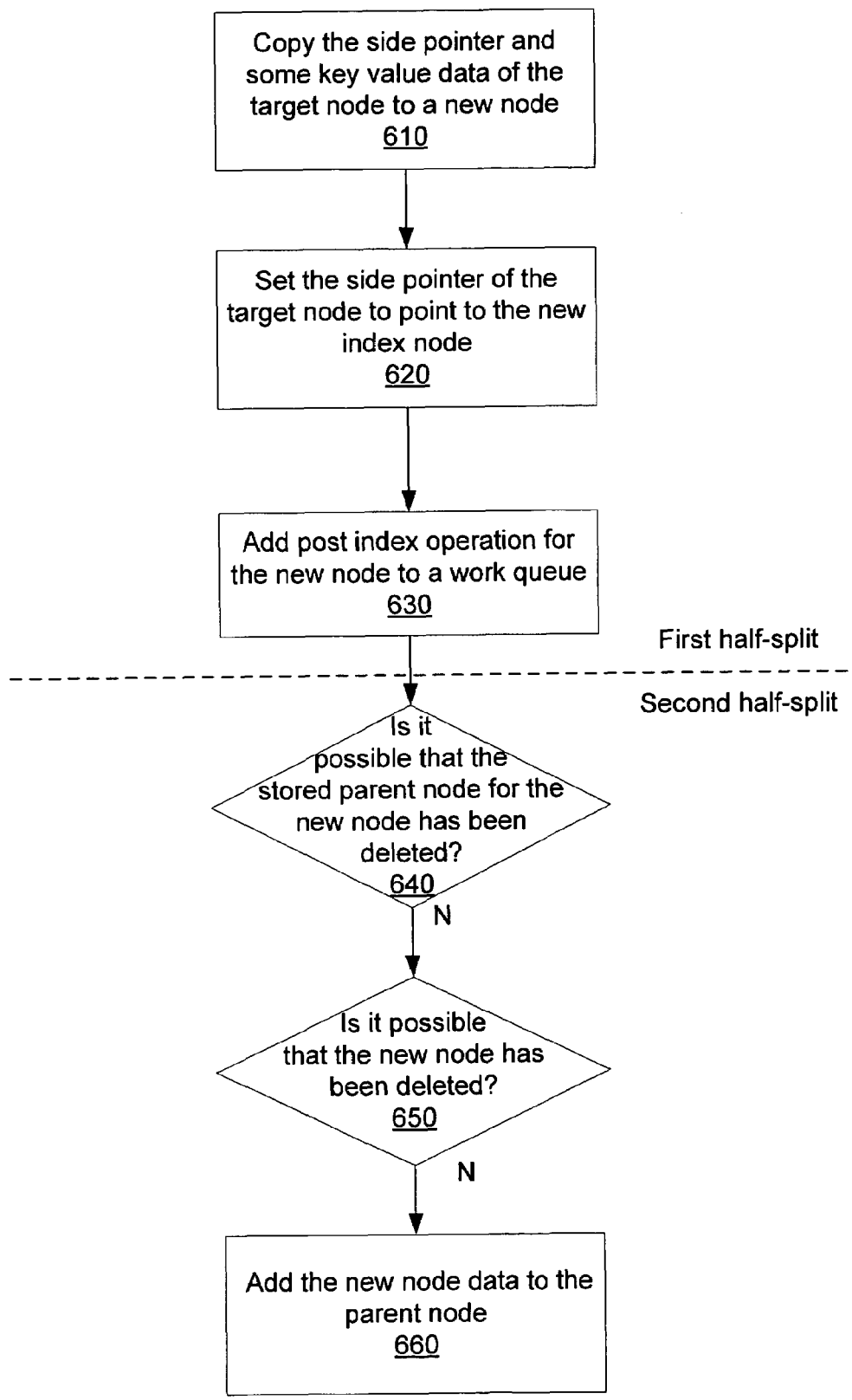
FIG. 6 is a flow diagram of a split node operation according to one embodiment.

FIG. 6 is a flow diagram of a split node operation according to one embodiment. In FIG. 6, first the side pointer and a portion of the key value data of the target node are copied to a new node, in step 610. Then the pointer of the target node is set to point to the new index node in step 620. After this, a post index operation for the new node is added to a work queue in step 630. These steps 610 through 630 are the first half-split.

When post index operation is taken off the queue to be performed, a check is performed to see if the stored parent node for which an index term is being posted may have been deleted, in decision 640. This is done, in one embodiment, by consulting a delete state. In decision 650, a check is performed to see if the new node for which an index term is being posted may have been deleted. This is done, in one embodiment, by consulting a delete state. In step 660, if the parent node and the new node for which a term is being posted both have not been deleted, the new index node data is added to the parent node.

In one embodiment, if it is possible that the stored parent node has been deleted (in other words, a "yes" answer to decision 640) or that the new node has been deleted (a "yes" answer to decision 650) then step 660 does not occur. The second half-split operation is abandoned. As described above, this abandonment of the posting of the index term when delete states indicate that a deletion may have occured allows B-link tree concurrency to be accomplished in a simple manner and avoids costly retraversals while allowing for the resultant "missing" node postings to be detected and the node posting to be peformed at a later time. In an alternate embodiment, a retraversal may be done to ensure that the stored parent node and new node are both still in existence.

Delete Node Operations

When a node is deleted, the delete node operation is run on the node. This permits the consolidation of index nodes with low occupancy. The delete node operation first calls the access parent operation to access the parent node of the node targeted for deletion. Access parent finds the parent node. Delete state information for the target node will be found in the parent node; this delete state information is updated in the access parent operation. Access parent returns with the parent node latched.

The left sibling of the target node is then accessed and latched. The target node is then accessed and latched. The contents of the target node are moved to the left sibling. The target node is then de-allocated and its index term removed from the parent.

The steps in Delete Node, in one embodiment, are as follows:

1. Perform Access Parent to find parent of target node. If an error is returned, abort.
2. Remove the index term for the deleted node. This will cause subsequent searches to access the left sibling instead.
3. Retain the latch on the parent while latching the left sibling of the target node. If the parent node has no left sibling for target node to be consolidated, abort.
4. Latch the node to be consolidated via a side traversal from its left sibling. If the left sibling's pointer does not equal the node to be consolidated, abort. Unlatch the parent node.

Figure 7:
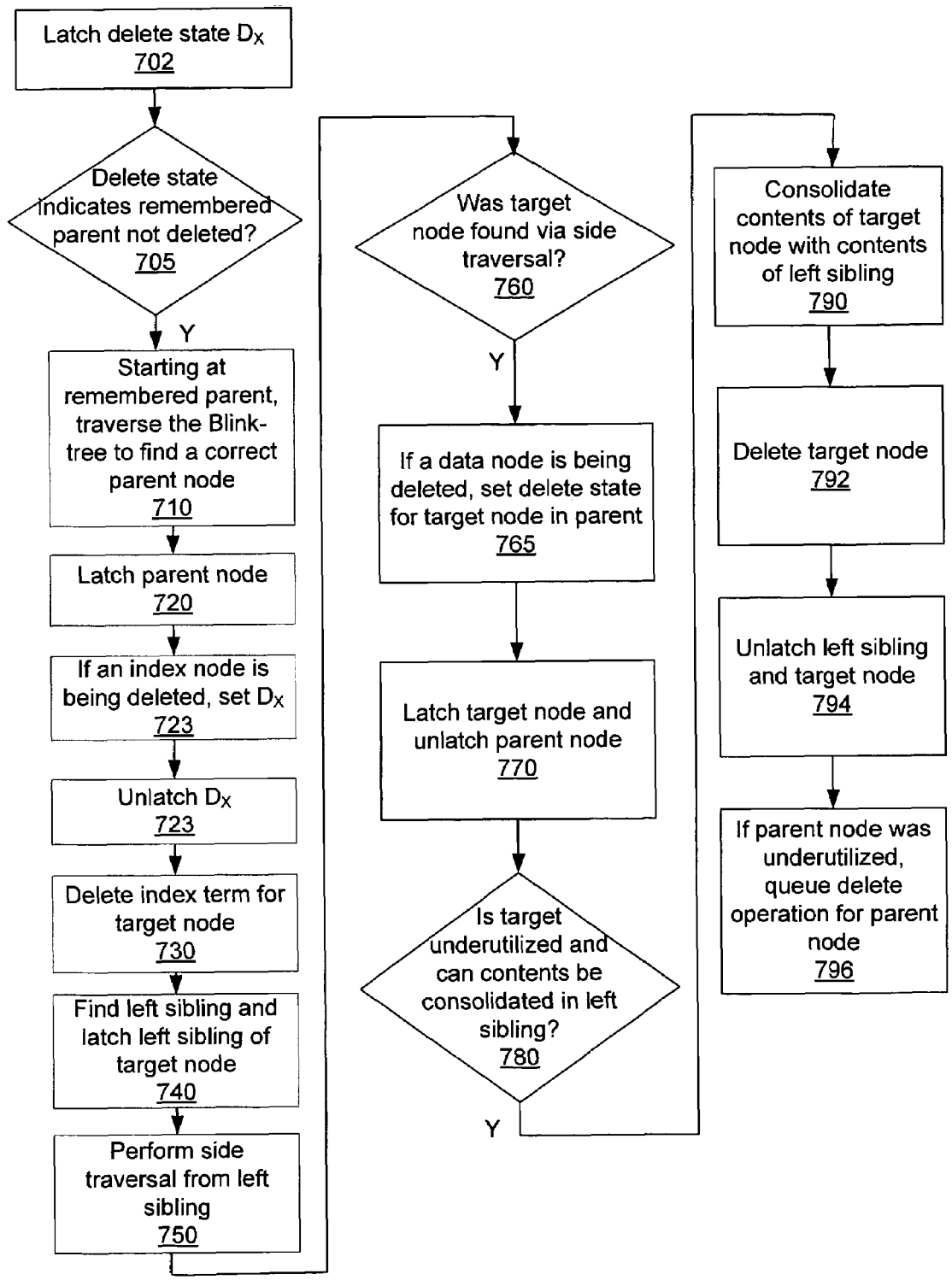
FIG. 7 is a flow diagram of a delete node operation according to one embodiment.

5. Check whether original node remains under-utilized, and whether its contents will fit into its left sibling. If so, it will be consolidated, i.e., the target node's data and sibling pointer is moved to the left sibling. Otherwise return without consolidating.
6. Delete the target node.
7. Unlatch the left sibling and target nodes.
8. If parent is under-utilized, enqueue a Delete Node action for the parent node.
9. Return FIG. 7 is a flow diagram of a delete data node operation according to one embodiment. The delete state $D_X$ is latched (step 702) and checked (step 705) and, if the delete state indicates that the parent node has not been deleted, the $B^{link}$-tree data structure is traversed, starting at the remembered parent, to find the current parent for the target node, step 710. This parent node is latched in step 720. If the delete is for an index node, the delete state $D_X$ is set to indicate that an index node has been deleted, step 723. The delete state $D_X$ is unlatched in step 725. Next, the index term for the target node is deleted in step 730. The left sibling of the target node is then accessed and latched in step 740. In step 750, a side traversal is then performed on the left sibling, for example, by following the side pointer of the left sibling. If the target node is found via said side traversal (decision 760), the deletion proceeds. Otherwise, the operation is abandoned. If a data node is being deleted, the delete state ($D_D$) for the node is updated to reflect that it will be deleted in step 765. The parent node can then be unlatched in step 770 and the target node is latched. The target node is then examined to determine if it is under-utilized and if the contents of the target node can be consolidated with the contents of the left sibling in decision 780. If this is the case, the data including the side pointer and key data from the target node is copied to the left sibling in step 790. The target node is then deleted in step 792. The left sibling and target nodes are then unlatched in step 794. In step 796, if the parent node had been found under-utilized, a delete operation is scheduled for the parent.

Index Delete State $D_X$

As described above, delete state generally stores state information regarding whether a node was definitely not deleted, or whether it may have been deleted. In one embodiment, this is done using a stored binary state for each index node.

In another embodiment, delete state is stored using counters. Index delete state $D_X$ is maintained as a counter that is incremented whenever an index node is deleted. Before an action is placed on the work queue, the present value of $D_X$ is stored along with the action on the queue.

When the action is performed, if $D_X$ has changed from the remembered index delete state, this is treated as a "may have been deleted" state. While this is a conservative method (because it marks all nodes as "may have been deleted" even if only one was) if deletes are not common it will cause few problems. Because leaf node deletes, which are more common, are tracked separately from index node deletes, $D_X$ rarely changes.

During an unsuccessful parent access, the new $D_X$ counter value is saved so that when the need for the index posting is detected again, the more recent $D_X$ value is entered with the enqueued action, hence making it possible for this later action to complete successfully. This is done because a change in DX is used to determine whether a node may have been deleted between the time a structure modification is scheduled and the time when it is actually done. For example, because of a sibling traversal, it may be discovered that an index term has not been posted. A new index term posting is scheduled. The latest Dx value is stored when the posting is scheduled, and it is compared to the current Dx value when the parent node is accessed to post the index term. The new posting thus will only fail if there are further node deletes between the scheduling of the new posting and the parent node is accessed for execution of the index term posting.

If the system crashes, all queued actions are lost. Therefore $D_X$ state need not be maintained across a system crash, but can be restarted when the system is brought up again.

Data Delete State $D_D$

The data delete state is used to determine whether leaf nodes that are immediate descendents of a lowest level index node may have been deleted. If not, a new node resulting from a split will not have been deleted, and the index term for that new node may be posted in that lowest level index node, without further verification that the node still exists.

The $D_D$ state describing node deletes among leaf nodes is stored in their parent index node. Some access savings are achieved, since the parent index node is accessed in any event during the posting operation.

$D_D$ may be maintained as a binary state for each leaf node in a given index node. In another embodiment, as with $D_X$ state, $D_D$ is maintained as a counter. Whenever a leaf node is deleted, the parent is latched and accessed in any event, in order to post the index term. Hence, the update of $D_D$ during leaf node delete occurs with little overhead.

If $D_D$ for the parent node has changed when we attempt to post an index term for a new leaf node split, then the new node may already have been deleted, and hence no index term posting is required. In that case, we abort the posting.

To make this "optimistic" approach work, the prior value for $D_D$ is stored when the node is visited in the traversal on the way to a leaf node. No additional latching is required.

The modifications to the operations listed above to implement the counter version of delete states include:
  read and remember $D_X$ state prior to accessing $B^{link}$-tree;
  read and remember $D_X$ state whenever we examine it.
  read and remember $D_D$ state in parent of leaf before accessing a leaf node;
  include remembered $D_D$ or $D_X$ on enqueued structure modifications;
  latch couple from examining Dx to accessing the parent node.
  latch coupling during traverse instead of holding only single latch at a time;
  increment $D_X$ state when deleting index node;
  increment $D_D$ state when deleting leaf node;
  compare $D_X$ to remembered $D_X$ before accessing parent;
  compare $D_D$ state to remembered $D_D$ state to verify that new leaf node from split still exists; and
  abandon structure modifications should delete states $D_X$ or $D_D$ indicate node delete.

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed:

1. A method for storing one or more data records in a $B^{link}$-tree data structure comprising at least two nodes, said nodes comprising at least one index node and at least one leaf node, where each of said data records is associated with a key, the method comprising:

storing at least one delete state, where said at least one delete state is associated with one or more of said nodes;

performing a node operation on a target node from among said nodes, where said node operation is a delete node operation for a given target node, and where said step of performing said node operation on a target node from among said nodes comprises:

determining whether a remembered parent node may have been deleted using said delete state associated with said remembered parent node and aborting said delete node operation if said delete state indicates that said remembered parent node may have been deleted;

traversing said $B^{link}$-tree data structure to find a connect parent node corresponding to the parent for said target node and a left sibling for said target node;

latching said parent node;

deleting an index term for said target node from said parent node;

latching said left sibling node;

performing a side traversal of said left sibling;

latching said target node, if found by said side traversal;

unlatching said parent node;

determining if said target node is under-utilized and if the contents of said target node can be consolidated with the contents of said left sibling in said left sibling;

if said target node is under-utilized and the contents of said target node can be consolidated with the contents of said left sibling, copying data from said target node comprising a side pointer, a key space description associated with said side pointer and key values to said left sibling;

unlatching said left sibling node and target node, and deleting said target node; and updating said at least one delete state in response to said node operation.

2. The method of claim 1, where said deleting said target node comprises updating said associated delete state.

3. The method of claim 1, where said step of traversing said $B^{link}$-tree data structure to find a connect parent node corresponding to the parent for said target node and a left sibling for said target node comprises checking said associated delete state and if said delete state indicates that a stored parent node for said target node may have been deleted, traversing said $B^{link}$-tree data structure to find said parent node for said target node.

4. A system for storing one or more data records in a $B^{link}$-tree data structure comprising at least two nodes, said nodes comprising at least one index node and at least one leaf node, where each of said data records is associated with a key, the system comprising:

delete state storage for storing at least one delete state, where said at least one delete state is associated with one or more of said nodes;

node operation logic for performing a node operation on a target node from among said nodes, where said node operation is a delete node operation for a given target node, and where said node operation logic comprises:

determination logic for determining whether a remembered parent node may have been deleted using said delete state associated with said remembered parent node and aborting said delete node operation if said delete state indicates that said remembered parent node may have been deleted;

traversal logic for traversing said $B^{link}$-tree data structure to find a correct parent node corresponding to the parent for said target node and a left sibling for said target node;

parent node latching logic for latching said parent node;

index term deletion logic for deleting an index term for said target node from said parent node;

left sibling latching logic for latching said left sibling node;

side traversal logic for performing a side traversal of said left sibling;

target node latching logic for latching said target node, if found by said side traversal;

parent node unlatching logic for unlatching said parent node;

target node under-utilization logic if said target node is latched, determining if said target node is under-utilized and if the contents of said target node can be consolidated with the contents of said left sibling in said left sibling;

consolidation logic for, if said target node is under-utilized and the contents of said target node can be consolidated with the contents of said left sibling, copying data from said target node comprising a side pointer, a key space description associated with said side pointer and key values to said left sibling;

left sibling unlatching logic for unlatching said left sibling node; and target node deletion logic deleting said target node; and delete state logic for updating said at least one delete state in response to said node operation.

5. The system of claim 4, where said node operation logic further comprises:

parent node utilization logic for determining if said parent node is under-utilized; and delete enqueueing logic for if said parent node is under-utilized, enqueueing a delete node operation for said parent node.

6. The system of claim 4, where said target node deletion logic triggers an update by said delete state logic for updating said delete states.

7. The system of claim 4, where said traversal logic comprises delete state checking logic for checking said associated delete state and if said delete state indicates that a stored parent node for said target node may have been deleted, traversing said $B^{link}$-tree data structure to find said parent node for said target node.

8. A computer-readable storage medium for storing one or more data records in a $B^{link}$-tree data structure comprising at least two nodes, said nodes comprising at least one index node and at least one leaf node, where each of said data records is associated with a key, said computer-readable storage medium comprising computer executable modules having computer executable instructions, the modules comprising instructions for performing the steps of:

storing at least one delete state, where said at least one delete state is associated with one or more of said nodes;

performing a node operation on a target node from among said nodes, where said node operation is a delete node operation for a given target node, and where said step of performing a node operation on a target node from among said nodes comprises:

determining whether a remembered parent node may have been deleted using said delete state associated with said remembered parent node and aborting said delete node operation if said delete state indicates that said remembered parent node may have been deleted;

traversing said $B^{link}$-tree data structure to find a correct parent node corresponding to the parent for said target node and a left sibling for said target node;

latching said parent node;

deleting an index term for said target node from said parent node;

latching said left sibling node;

performing a side traversal of said left sibling;

latching said target node, if found by said side traversal;

unlatching said parent node;

if said target node is found, determining if said target node is under-utilized and if the contents of said target node can be consolidated with the contents of said left sibling in said left sibling;

if said target node is under-utilized and the contents of said target node can be consolidated with the contents of said left sibling, copying data from said target node comprising a side pointer, a key space description associated with said side pointer and key values to said left sibling;

unlatching said left sibling node, and deleting said target node; and updating said at least one delete state in response to said node operation.

9. The computer-readable storage medium of claim 8, where said step of performing a node operation on a target node from among said nodes further comprises:

prior to performing a side traversal on said left sibling, obtaining an exclusive latch for said parent node and for said left sibling.

10. The computer-readable storage medium of claim 8, where said step of performing a node operation on a target node from among said nodes further comprises:

determining if said parent node is under-utilized; and if said parent node is under-utilized, enqueueing a delete node operation for said parent node.

11. The computer-readable storage medium of claim 8, where said deleting said target node comprises updating said associated delete state.

12. The computer-readable storage medium of claim 8, where said step of traversing said $B^{link}$-tree data structure to find a correct parent node corresponding to the parent for said target node and a left sibling for said target node comprises checking said associated delete state and if said delete state indicates that a stored parent node for said target node may have been deleted, traversing said $B^{link}$-tree data structure to find said parent node for said target node.

13. A method for storing one or more data records in a $B^{link}$-tree data structure comprising at least two nodes, said nodes comprising at least one index node and at least one leaf node, where each of said data records is associated with a key, the method comprising:

storing at least one delete state, where said at least one delete state is associated with one or more of said nodes;

performing a node operation on a target node from among said nodes, where said node operation is a split node operation for a given target node, and where said step of performing said node operation on said target node from among said nodes comprises:

copying a side pointer of said target node and a portion of key data of said target node to a new target node;

setting said side pointer of said target node to point to said new target node; and adding a post operation for said target node to a work queue, where said port operation comprises:

determining in a first determination whether a stored parent node for said new target node may have been deleted using said delete state associated said stored parent node;

if said first determination determines that said stored parent node for said target node has not been deleted, determining in a second determination whether said new target node may have been deleted using said delete state associated with said new target node; and if said first determination determines that said stored parent node for said target node has not been deleted and said second determination determines that said new target node has not been deleted, adding new index term to said stored parent node; and updating said at least one delete state in response to said node operation.

14. The method of claim 13 where if said delete state indicates that a node may have been deleted, said post operation is abandoned.

15. The method of claim 13 further comprising:

if an index term has not been posted because delete state indicated that the target node or its parent may have been deleted, performing a subsequent side traversal from a left sibling of the new target node; and where if, said subsequent side traversal indicates that the index term has not been posted; a post index term is enqueued for said new target node.

16. A system for storing one or more data records in a $B^{link}$-tree data structure comprising at least two nodes, said nodes comprising at least one index node and at least one leaf node, where each of said data records is associated with a key, the system comprising:

delete state storage for storing at least one delete state, where said at least one delete state is associated with one or more of said nodes;

node operation logic for performing a node operation on a target node from among said nodes, where said node operation is a split node operation for a given target node, and where said node operation logic comprises:

target node data copying logic for copying a side pointer of said target node and a portion of key data of said target node to a new target node;

side pointer setting logic for setting said side pointer of said target node to point to said new target node; and post operation enqueueing logic for adding a post operation for said target node to a work queue, where said post operation enqueuing logic comprises:

first determination logic for determining in a first determination whether a stored parent node for said new target node may have been deleted using said delete state associated with said stored parent node;

second determination logic for, if said first determination determines that said stored parent node for said target node has not been deleted, determining in a second determination whether said new target node may have been deleted using said delete state associated with said new target node; and new index term addition logic for, if said first determination determines that said stored parent node for said target node has not been deleted and said second determination determines that said stored new target node has not been deleted, adding new index term to said stored parent node; and delete state logic for updating said at least one delete state in response to said node operation.

17. The system of claim 16 where if said delete state indicates that a node may have been deleted, said post operation is abandoned.

18. The system of claim 16 further comprising:

side traversal logic for, if an index term has not been posted because delete state indicated that the target node or its parent may have been deleted, performing a subsequent side traversal from a left sibling of the new target node; and post index term enqueuing logic for, if, said subsequent side traversal indicates that the index term has not been posted; a post index term is enqueued for said new target node.

19. A computer-readable storage medium for storing one or more data records in a B$^{link}$-tree data structure comprising at least two nodes, said nodes comprising at least one index node and at least one leaf node, where each of said data records is associated with a key, said computer-readable storage medium comprising computer executable modules having computer executable instructions, the modules comprising instructions for performing the steps of:

storing at least one delete state, where said at least one delete state is associated with one or more of said nodes;

performing a node operation on a target node from among said nodes, where said node operation is an split node operation for a given target node, and where said step of performing said node operation on a target node from among said nodes comprises:

copying a side pointer of said target node and a portion of key data of said target node to a new index node;

setting said side pointer of said target node to point to said new index node; and adding a post operation for said target node to a work queue, where said post operation comprises:

determining in a first determination whether a stored parent node for said new index node may have been deleted using said delete state associated with said stored parent node;

if said first determination determines that said stored parent node for said target node has not been deleted, determining in a second determination whether said new index node may have been deleted using said delete state associated with said new index node; and if said first determination determines that said stored parent node for said target node has not been deleted and said second determination determines that said stored new index node has not been deleted, adding new index node data to said stored parent node; and updating said at least one delete state in response to said node operation.

20. The computer-readable storage medium of claim 19 where if said delete state indicates that a node may have been deleted, said post operation is abandoned.

21. The computer-readable storage medium of claim 19 further comprising:

if an index term has not been posted because delete state indicated that the target node or its parent may have been deleted, performing a subsequent side traversal from a left sibling of the new target node; and where if, said subsequent side traversal indicates that the index term has not been posted; a post index term is enqueued for said new target node.

* * * * *

UNITED STATES PATENT AND TRADEMARK OFFICE
CERTIFICATE OF CORRECTION

PATENT NO. : 7,383,276 B2
APPLICATION NO. : 10/768527
DATED : June 3, 2008
INVENTOR(S) : David B. Lomet Page 1 of 1

It is certified that error appears in the above-identified patent and that said Letters Patent is hereby corrected as shown below:

In column 17, line 26, in Claim 1, delete "connect" and insert -- correct --, therefor.

In column 17, line 53, in Claim 3, delete "connect" and insert -- correct --, therefor.

Signed and Sealed this
Nineteenth Day of April, 2011

David J. Kappos
*Director of the United States Patent and Trademark Office*